United States Patent [19]

Shiraki et al.

[11] 4,377,665
[45] Mar. 22, 1983

[54] PROCESS FOR PRODUCING BLOCK COPOLYMER RESIN

[75] Inventors: Toshinori Shiraki, Yamato, Japan; Akio Yamori, Victoria, Australia; Hideo Morita, Yokohama, Japan

[73] Assignee: Asahi Kasei Kogyo Kabushiki Kaisha, Osaka, Japan

[21] Appl. No.: 316,420

[22] Filed: Oct. 29, 1981

[30] Foreign Application Priority Data

Nov. 12, 1980 [JP] Japan ............................. 55-159348

[51] Int. Cl.$^3$ ............................................. C08F 297/04
[52] U.S. Cl. ..................................... 525/250; 525/316
[58] Field of Search ........................................ 525/250

[56] References Cited

U.S. PATENT DOCUMENTS 3,639,517  2/1972  Kitchen et al. ...................... 525/92

FOREIGN PATENT DOCUMENTS 47-3252   1/1972  Japan .
47-28915  7/1972  Japan .
48-2423   1/1973  Japan .
895980    5/1962  United Kingdom .
1457023   of 1976 United Kingdom .

Primary Examiner—Stanford M. Levin
Attorney, Agent, or Firm—Birch, Stewart, Kolasch & Birch

[57] ABSTRACT

In producing a block copolymer resin having vinyl aromatic hydrocarbon polymer blocks such as of styrene and polymer blocks primarily composed of conjugated diene such as of butadiene successively through living polymers using an organolithium compound as a catalyst in an aliphatic solvent, the vinyl aromatic hydrocarbon monomer for forming the vinyl aromatic hydrocarbon polymer block is added at a controlled rate, at the stage when the vinyl aromatic hydrocarbon content in the polymer formed has reached a certain value, higher than the polymerization rate of the vinyl aromatic hydrocarbon monomer at the polymerization temperature but at a rate which can maintain the solubility parameter of the liquid phase portion in the polymerization system at 7.7 or less, whereby a block copolymer resin with good transparency and impact strength can be produced with good productivity.

18 Claims, No Drawings

PROCESS FOR PRODUCING BLOCK COPOLYMER RESIN

BACKGROUND OF THE INVENTION

The present invention relates to a process for producing a block copolymer resin which is transparent and has excellent mechanical properties, especially impact strength. More specifically, the present invention pertains to a process for producing a block copolymer resin comprising a vinyl aromatic hydrocarbon and a conjugated diene with employment of an organolithium compound as a catalyst in a solvent principally composed of an aliphatic hydrocarbon in which the rate of addition of the vinyl aromatic hydrocarbon monomer is controlled within a specific range at a stage at which the content of the vinyl aromatic hydrocarbon in the polymer formed has reached a specific value, whereby the block copolymer resin can be produced in a stable solution or suspension.

It has been well known in the art to produce block copolymers having various characteristics by copolymerization of a vinyl aromatic hydrocarbon and a conjugated diene by using an organolithium compound as a catalyst. Especially in case of block copolymer resins containing a relatively higher content of a vinyl aromatic hydrocarbon, it is possible depending upon the polymerization conditions to be employed to obtain block copolymers which are transparent and have excellent impact strength. These copolymer resins tend to find increased demands primarily in the field of packagings and vessels for foods. As the methods for production of these block copolymer resins, there have been proposed various methods, as disclosed in Japanese Patent Publication after examination Nos. 19286/1961, 3252/1972, 28915/1972 and 2423/1973, and U.S. Pat. No. 3,639,517. According to these methods, however, there are used as a solvent for polymerization aromatic hydrocarbons or alicyclic hydrocarbons having greater solubilities for block copolymers with relatively higher contents of vinyl aromatic hydrocarbon. These solvents have greater latent heat for vaporization and hence the polymer can be recovered from the block copolymer resin solution after polymerization only with a large energy consumption. Moreover, such a solvent cannot completely be removed, but remains in a considerable amount in the block copolymer resin finally obtained, to great disadvantage.

For overcoming such a drawback, one can consider to employ an aliphatic hydrocarbon having a relatively smaller vaporization latent heat as a solvent. But a block copolymer resin with a relatively higher vinyl aromatic hydrocarbon content is generally hardly soluble in an aliphatic hydrocarbon and there may be caused various troubles according to conventional methods such as precipitation of masses of block copolymers or deposition of such masses on stirring blades or vessel walls in a polymerization reactor, thereby making polymerization operations extremely difficult. For this reason, an aliphatic hydrocarbon has been unsuccessfully used as a solvent.

Quite recently, as a method for overcoming the problem as described above, there has been proposed a method in which a block copolymer resin is formed as a suspension in a solvent, as disclosed in U.K. Pat. No. 1,457,023. According to this method, in production of a block copolymer resin with use of an aliphatic hydrocarbon as a solvent, a mixture of a vinyl aromatic hydrocarbon and a conjugated diene is polymerized in the first step of polymerization, followed by the second step of polymerization, in which the vinyl aromatic hydrocarbon is subsequently added at a rate below the substantial average polymerization rate at the polymerization temperature. As a result of such a two-step polymerization, there can be formed a block copolymer resin which is suspended in a solvent.

According to this method, however, the rate of the vinyl aromatic hydrocarbon added must necessarily be slow enough, since it is required to add the vinyl aromatic hydrocarbon at the rate below the substantial average polymerization rate, i.e. at the rate permitting no residual monomer to be present in the polymerization system. As a consequence, this method involves the drawback that no improvement of productivity can be expected. As another critical disadvantage, block copolymer resins will readily be separated from the solvent in this method and may be deposited at the bottom of the polymerization reactor under the conditions of insufficient stirring or may become clogged during transfer through the pipes to make transfer of polymers difficult. Thus, this method is impractical in commercial application.

The present inventors have made extensive studies to overcome the problems of prior art in production of block copolymer resins and have developed a process capable of producing a block copolymer resin having good transparency and excellent impact strength in a stable solution of suspension, and thus have accomplished the present invention.

SUMMARY OF THE INVENTION

Accordingly, the present invention provides a process for producing a block copolymer resin comprising at least one vinyl aromatic hydrocarbon polymer block and at least one polymer block primarily composed of a conjugated diene, the weight ratio of vinyl aromatic hydrocarbon to conjugated diene being 55:45 to 95:5, using an organolithium compound as a catalyst in a solvent composed principally of an aliphatic hydrocarbon, wherein the improvement comprises adding continuously a monomer of a vinyl aromatic hydrocarbon to be added for formation of the vinyl aromatic hydrocarbon polymer block, at the stage of polymerization at which the vinyl aromatic hydrocarbon content in the polymer formed has reached 55% by weight or more, at a rate which is higher than the substantial average polymerization rate of said monomer at the polymerization temperature and yet maintains the solubility parameter of the liquid phase portion in the polymerization system at substantially not higher than 7.7 to further continue polymerization.

The present invention is described in detail hereinafter.

DETAILED DESCRIPTION OF THE INVENTION

The aliphatic hydrocarbon to be employed as the solvent in the present invention is a compound having a solubility parameter of substantially less than 7.7, preferably less than 7.6 and not lower than 6.0, more preferably less than 7.4 and not lower than 6.4, including, for example, propane(solubility parameter=6.4), butane(6.8), pentane(7.0), hexane(7.3), heptane(7.4), isopentane(6.8), octane(7.6) and isooctane(7.5). The aliphatic hydrocarbon having a solubility parameter of less than 7.6 and not lower than 6.0 is easily obtained industrially and therefore is preferred as the solvent employed according to the present invention. These compounds may be used alone or in admixture of two or more. The solvent to be employed in the process of the present invention may also incorporate one or two or more alicyclic hydrocarbons such as cyclopentane(8.7), methyl cyclopentane(8.2), cyclohexane(8.2), methyl cyclohexane (7.8) or aromatic hydrocarbons such as benzene(9.2) and toluene(8.9), in an amount within the range so that the solubility parameter of the resultant solvent mixture may be maintained at substantially less than 7.7. Further, if necessary, the solvent to be employed in the present invention may also contain a polar compound such as ethers, amines and thioethers as far as they are mixed therein within the aforesaid range.

In the present invention, preferable solvents may include aliphatic hydrocarbons having 5 to 7 carbon atoms as described above and mixtures thereof; solvent mixtures comprising 75 wt.% or more of said aliphatic hydrocarbons having 5 to 7 carbon atoms or mixtures thereof and 25 wt.% or less of alicyclic hydrocarbons having 5 to 7 carbon atoms as described above; and solvent mixtures comprising 90 wt.% or more of said aliphatic hydrocarbons having 5 to 7 carbon atoms or mixtures thereof and 10 wt.% or less of benzene or toluene.

The solubility parameter $\delta$, which was proposed by Hildebrand as a measure for judgement of solubility, is represented by molecular cohesive energy Ec and molecular volume V as follows:

$$\delta = \sqrt{Ec/V}$$

The values for solubility parameter $\delta$ are widely known from various literatures and handbooks, but they may sometimes differ depending upon the difference in measurement methods and manner of expressions. In the present invention, the values listed in "Polymer Handbook" edited by J. Brandrup & E. H. Immergut(John Wiley & Sons) and the values calculated by the method of P. A. Small also described in said literature are adopted.

When the solvent to be employed in the present invention is a mixture of two or more compounds, the value of its solubility parameter $\delta$ is calculated from the following equation:

$$\delta = \sum_{n=1}^{n=N} x_n \times \delta_n$$

wherein $x_n$ is a molar fraction of one component in a mixture composed of n kinds of compounds, and $\delta_n$ the solubility parameter of said component.

The solvent principally composed of these aliphatic hydrocarbons may be used in an amount of 1 to 20 parts by weight, preferably 2 to 10 parts by weight, per one part by weight of the total monomers.

The organolithium compound to be employed as the catalyst in the process of the present invention is an organic compound having at least one lithium atom, as exemplified by n-propyllithium, isopropyllithium, n-butyllithium, sec-butyllithium, tertbutyllithium, n-pentyllithium, benzyllithium, 1,4-dilithio-n-butane, 1,2-dilithio-1,2-diphenylethane, oligo-isoprenyldilithium, etc. Especially, n-butyllithium and sec-butyllithium are generally used. These organolithium compounds may be used alone or in admixture of two or more. The organolithium compound may be employed in an amount of 0.005 to 5 mole %, preferably 0.01 to 1 mole %, more preferably 0.02 to 0.2 mole %, based on the total monomers. In the process of the present invention, it is preferred to add the organolithium compound at one time in order to obtain a final block copolymer resin with relatively homogeneous composition or molecular weight distribution. But it is also possible to add the catalyst in divided portions, if desired.

The vinyl aromatic hydrocarbon to be employed in the process of the present invention may include styrene, o-methylstyrene, p-methylstyrene, p-tert-butylstyrene, 1,3-dimethylstyrene, $\alpha$-methylstyrene, vinylnaphthalene, vinylanthracene, etc. Among them, styrene is most common. All these vinyl aromatic hydrocarbons may be used alone or in admixture of two or more.

In this connection, according to the above described reference, solubility parameters of styrene, methylstyrene and $\alpha$-methylstyrene are 9.3, 9.1 and 8.5, respectively.

The conjugated diene to be employed in the process of the present invention is a diolefin having a pair of conjugated double bonds, as exemplified by 1,3-butadiene, 2-methyl-1,3-butadiene(isoprene), 2,3-dimethyl-1,3-butadiene, 1,3-pentadiene, 1,3-hexadiene, etc. Among them, 1,3-butadiene and isoprene are more preferred. All of these conjugated diene may be used alone or in admixture of two or more.

The vinyl aromatic hydrocarbon is employed in the process of the present invention in an amount of from 55 to 95% by weight, preferably from 60 to 90% by weight, more preferably from 65 to 85% by weight, based on the total monomers. Accordingly, the content of the conjugated diene is in the range of from 5 to 45% by weight, preferably from 10 to 40% by weight, more preferably from 15 to 35% by weight. With a content of the vinyl aromatic hydrocarbon less than 55% by weight, the resultant block copolymer resin has no resinous property, being markedly lowered in hardness and tensile strength. In contrast, with a content in excess of 95% by weight, impact strength is lowered and no tough resin can be obtained.

In practicing the process of the present invention, it is necessary to sufficiently preclude the impurities which may deactivate the aforesaid organolithium compounds or living polymers, such as water, oxygen and carbon dioxide, from these solvents and monomers.

According to the process of the present invention, the monomers may be added to the polymerization system in a fashion so that at least one, preferably at least two vinyl aromatic hydrocarbon polymer blocks and at least one, preferably at least two polymer blocks composed principally of a conjugated diene, may be finally produced. Typical examples of the structures of the block copolymer resins finally produced are shown below:

$(A-B)_n$, $B-(A-B)_n$, $(A-B)_mC$, $[(B-A)_{\overline{n}}]_{\overline{m}}X$,
$[B-A-B)_n]_mX$, $[(B-A-B)_n]_mC$ wherein A is a vinyl aromatic hydrocarbon polymer block; B a polymer block composed principally of a conjugated diene; C a residue of a polyfunctional organolithium compound having two or more lithium atoms in one molecule; X a residue of a polyfunctional coupling agent such as silicon tetrachloride, tin tetrachloride, polybasic acid ester and polyepoxy compound; n an integer of 1 or more; and m an integer of 2 or more.

In the process of the present invention, the especially preferred block copolymer resin has a structure of $B_1$-$A_1$-$B_2$-$A_2$, wherein the vinyl aromatic hydrocarbon content in the $B_1$-$A_1$ segments is from 50 to 90% by weight, preferably from 55 to 80% by weight, more preferably from 60 to 75% by weight, and the intermediary vinyl aromatic hydrocarbon polymer block($A_1$) based on the total vinyl aromatic hydrocarbon polymer block($A_1+A_2$) is from 10 to 40% by weight, preferably from 15 to 35% by weight, more preferably from 17 to 30% by weight. This block copolymer resin has extremely excellent transparency and impact strength.

In the process of the present invention, "the polymer block composed principally of conjugated diene" refers to a polymer block containing 50% by weight or more, preferably 70% by weight or more, more preferably 90% by weight or more, of conjugated diene. The vinyl aromatic hydrocarbon copolymerized in the polymer block composed principally of a conjugated diene may be distributed homogeneously throughout the said polymer block, or alternatively distributed in a tapered structure. Among them, an especially preferred polymer block composed principally of a conjugated diene is a homopolymer block of a conjugated diene.

The vinyl aromatic hydrocarbon polymer block formed according to the process of the present invention may have an average molecular weight of generally from 5,000 to 1,000,000, preferably from 10,000 to 500,000, while the polymer block composed principally of a conjugated diene may have an average molecular weight of generally from 5,000 to 1,000,000, preferably from 10,000 to 500,000. With a molecular weight lower than the said ranges, the resultant copolymer has inferior mechanical properties. On the other hand, with a molecular weight over the said ranges, the processability of the copolymer resin is undesirably deteriorated.

The salient feature in the process of the present invention is to add continuously a vinyl aromatic hydrocarbon monomer to be added for formation of a vinyl aromatic hydrocarbon polymer block, at the stage at which the vinyl aromatic hydrocarbon content in the polymer formed has reached 55% by weight or more, more preferably 60% by weight or more, furthermore effectively 65% by weight or more, at a rate which is higher than the substantial average polymerization rate at the polymerization temperature and yet maintains the solubility parameter of the liquid phase portion in the polymerization system at 7.7 or less, preferably from 6.0 to 7.6, more preferably from 6.4 to 7.4, to further continue polymerization, whereby it is possible to produce a block copolymer having a relatively higher vinyl aromatic hydrocarbon content in state of a stable solution or suspension. When the solubility parameter of the liquid phase portion in the polymerization system exceeds 7.7, such troubles are caused unfavourably as the block copolymer resins will readily be separated from the solvent and may be accumulated at the bottom of the polymerization reactor or deposited to the stirring blades or the walls of the reactor. Considering that the aliphatic hydrocarbon having a solubility parameter of less than 7.6 and not lower than 6.0 which is easily obtained industrially is employed suitably as stated before, the solubility parameter of the liquid phase portion in the polymerization system is recommended to be maintained substantially in the range of from 6.0 to 7.6. At the stage before the vinyl aromatic hydrocarbon content in the polymer formed reaches 55% by weight, the polymer is soluble in a solvent composed principally of an aliphatic hydrocarbon and therefore it is not necessary to control the rate of the vinyl aromatic hydrocarbon to be added within a specific range. Thus, the process of the present invention can exhibit its useful effect at the stage when the polymer becomes difficult to be homogeneously dissolved in the aforesaid solvent, namely at the stage when a polymer with a vinyl aromatic hydrocarbon content of higher than 55% by weight is polymerized. If desired, however, even at the stage when the vinyl aromatic hydrocarbon content in the polymer is still less than 55% by weight, the vinyl aromatic hydrocarbon monomer may be added at the rate as defined according to the present invention.

In the process according to the present invention, the addition of a vinyl aromatic hydrocarbon monomer to be added for formation of a vinyl aromatic hydrocarbon polymer block at a rate higher than the substantial average polymerization rate at the polymerization temperature means the addition at a rate exceeding the average polymerization rate of the vinyl aromatic hydrocarbon under the polymerization conditions of the said monomer. More specifically, that means, at the time of polymerization of the said monomer, it is added at a rate while keeping the existence of substantial amount of unreacted vinyl aromatic hydrocarbon monomers in the polymerization system. To keep the existence of substantial amount of unreacted monomer described herein means that unreacted monomers exist in the polymerization system during the polymerization of the said monomer at least in an analyzable amount. To represent in terms of preferable numerical range, the monomer should preferably exist in the polymerization system in an amount of at least 1% by weight or more, more preferably 3% by weight or more, still more preferably 5% by weight or more, based on the vinyl aromatic hydrocarbon added.

The solubility parameter of the liquid phase portion of the polymerization system in the process of the present invention means the solubility parameter of the mixed system of the solvent and the unreacted monomer in the polymerization system, which can be calculated according to the equation as set forth above from the mixing ratio of the above solvent to the unreacted monomer and the solubility parameters of respective components (the solubility parameter for the monomer is also adopted from the literature as set forth above).

In the process of the present invention, when the vinyl aromatic hydrocarbon monomer is added at a rate slower than that defined according to the present invention, it will take a long time for polymerization and undesirably worsen the productivity. In contrast, when the addition rate is too rapid and hence the unreacted vinyl hydrocarbon monomer having a high solubility parameter exists in the polymerization system so as to give a solubility parameter of the liquid phase portion in the polymerization system in excess of 7.7, the block copolymer formed will be separated from the polymerization solvent to be deposited at the bottom of the polymerization reactor or attached to the vessel walls or stirring blades in the reactor. According to the process of the present invention, a part of the monomers of vinyl aromatic hydrocarbon added at the rate as specified according to the present invention remains in the polymerization system on the completion of the addition of said monomers, but they can be left to stand for a certain period of time after the addition of said monomers to be polymerized substantially quantitatively. The time for standing, which is not particularly limitative, may be in the range from 1 minute to 5 hours, preferably 3 minutes to one hour, more preferably 5 minutes to 30 minutes. The temperature at which the polymerization mixture is left to stand is not limitative, but is preferred to be substantially the same temperature as that at which the vinyl aromatic hydrocarbon monomer is polymerized by being continuously added.

The process according to the present invention may be carried out at a polymerization temperature in the range of from −40° to 150° C., preferably of from 40° to 120° C. The time required for polymerization, which differs depending upon the conditions employed, is generally within 48 hours, especially suitably from 1 to 10 hours. The atmosphere in the polymerization system may desirably be replaced with an inert gas such as nitrogen gas. The polymerization may be conducted under a pressure enough to maintain the monomers and the solvent in a liquid phase under the polymerization temperature as specified above, and hence the pressure range is not particularly limitative. Furthermore, it is necessary to take care to preclude impurities such as water, oxygen or carbon dioxide from the polymerization system which will deactivate the catalyst or living polymers.

The living polymers of the block copolymer resin prepared according to the process of the present invention can be deactivated by an addition of a polymerization terminator such as water, an alcohol or carbon dioxide in an amount sufficient to deactivate the active terminals. When carbon dioxide is used as the polymerization terminator, carboxylic groups are introduced at the terminals of the polymer, or hydroxyl groups introduced when ethylene oxide is used. Thus, by suitable selection of the polymerization terminator, there can be produced block copolymer resins having various functional groups at the terminals.

The block copolymer resin prepared according to the process of the present invention can be recovered from its homogeneous polymer solution or stable suspension by conventional methods well known in the art. For instance, it may be recovered by precipitation with the use of a precipitant such as methanol or by evaporation of the solvent by heating the solution or the suspension. Further, it is also possible to recover the copolymer resin by evaporation of the solvent by steam distillation by blowing steam into the solution or the suspension.

The block copolymer produced by the process of the present invention can be combined with conventional stabilizing agents, reinforcing agents, fillers or other additives by standard procedures.

The block copolymer resin prepared according to the process of the present invention is transparent and has excellent impact strength, and it is useful as molding materials for various molded products. That is, the molding material of the block copolymer resin prepared as described above may be used as such or with coloration molded into extruded products such as sheets or films according to processing means similar to those for thermoplastics in general, or they can be heat molded under vacuum or pressure into molded articles, typically for a wide field of vessels or packages, including vessels or packages for foods, packing materials for blister, or packaging films for vegetables or confectioneries. In addition, it may be available in uses for which general purpose thermoplastic resins have been used, as in the field of toys, miscellaneous goods or electronics, prepared by injection molding or blow molding. Particularly, the resin prepared by the process of the present invention contains no plasticizer and therefore it is suitable for use in the field, in which transparency is highly required, typically the field of food vessels and packages. It is also possible to use the resin prepared by the process of the present invention in a mixture, by preparing according to conventional methods, with any of other thermoplastic resins such as alkenyl aromatic resins, olefinic resins, methacrylic resins or others.

The present invention is described exemplarily with reference to the following Examples, by which the present invention should not be construed in any way as limiting the scope thereof.

EXAMPLE 1

According to the procedure described below, there was prepared a block copolymer resin with styrene content of 70% by weight having a structure of $B_1$-$A_1$-$B_2$-$A_2$, in which the styrene content in the $B_1$-$A_1$ segments was 61% by weight and the percentage of the intermediary styrene block ($A_1$) based on the total sytrene polymer blocks ($A_1 + A_2$) was 20% by weight, in a solvent mixture (hereinafter referred to as solvent $S_1$) with a solubility parameter of about 7.5 containing about 80% by weight of n-hexane and 20% by weight of cyclohexane.

In a stainless steel polymerization reactor equipped with a stirrer which had been replaced internally with nitrogen gas, there were charged 4900 g of the previously purified and dried solvent $S_1$ and 900 g of a solution containing 30% by weight of butadiene in the solvent $S_1$, followed by addition of 2.5 g of n-butyl lithium as the catalyst. Polymerization was carried out at 70° C. for one hour. After polymerization of butadiene had been substantially completed, 420 g of styrene was added by means of a feeding pump over 30 minutes while maintaining the polymerization temperature at 70° C. After the addition was over, the reaction mixture was left to stand at the same temperature for 15 minutes to polymerize the unreacted styrene monomer substantially completely to form $A_1$ block. Subsequently, 2100 g of a solution containing 30% by weight of butadiene in the solvent $S_1$ was charged into the polymer solution and polymerization was carried out at 70° C. for 90 minutes. After the polymerization of butadiene had substantially been completed, 1680 g of styrene was further added by means of a feeding pump over 60 minutes while maintaining the polymerization temperature at 70° C. After the completion of the addition, the polymer mixture was left to stand at the same temperature for 20 minutes to polymerize substantially completely the unreacted styrene monomer to form the block $A_2$. At the stage of formation of the $A_1$ block in which the styrene content in the polymer formed was 61% by weight and at the stage of formation of the $A_2$ block in which the styrene content in the polymer formed was 70% by weight, the rate of addition of styrene was controlled within the range as specified according to the present invention, as confirmed by the presence of unreacted styrene in the polymerization mixture periodically sampled during formation of said blocks as well as by the fact that the solubility parameter of the liquid phase portion in the polymerization system calculated from the amount of the unreacted styrene and the amount of the solvent $S_1$ in the polymerization system was not more than 7.7.

To the thus prepared polymer solution, there were added 5 ml of methanol as polymerization terminator, 15 g of di-tertbutyl-p-cresol and 15 g of tris-nonylphenylphosphite as stabilizers.

The polymer mixture exhibited a white stable suspension and there was observed no sticking of the polymer to the vessel wall or stirring blades in the polymerization reactor. Then, the solvent was removed by heating to obtain a block copolymer resin. The stability of the polymer mixture in state of a suspension was very good, without indicating any separation of the polymer from the solvent even after standing at 50° to 70° C. for one month. When the polymer mixture was transferred to the step for stripping of the solvent, there was caused no problem such as clogging of lumps of polymers at the bottom of the polymerization reactor or in the transportation pipes.

The block copolymer resin obtained was compression molded into test pieces for evaluation of physical properties. The results of measurement of the physical properties of the molded product are shown in Table 1. The molded product was a resin with good transparency and extremely excellent impact strength.

COMPARATIVE EXAMPLE 1

After living polymers of the block copolymer having a structure of $B_1$-$A_1$-$B_2$ were produced in the same manner as in Example 1, the styrene monomer for formation of $A_2$ block was added at once to the polymerization system, under otherwise the same conditions as in Example 1, to prepare a block polymer resin. Namely, at the stage of formation of $A_2$ block when the styrene content in the block copolymer became 70% by weight, the styrene monomer to obtain $A_2$ block was added all at once to the polymerization system. By such an operation, the solubility parameter of the liquid phase portion in the polymerization system was found to be about 7.8, as confirmed from the amount of the solvent $S_1$ and the amount of the styrene monomer added in the polymerization system.

The resultant polymer solution was found to exhibit partially a state of suspension, but a considerable amount of polymers were observed sticking to the vessel walls or stirring blades in the polymerization reactor, and the stability of the polymer mixture was very poor.

COMPARATIVE EXAMPLE 2

Based on the method as disclosed in U.K. Pat. No. 1,457,023, a block copolymer resin with a styrene content of 70% by weight was prepared by the two-step polymerization method.

More specifically, 7000 g of the previously purified and dried solvent $S_1$, 900 g of butadiene and 420 g of styrene were firstly charged into the same polymerization reactor as used in Example 1. Then, with the addition of 2.5 g of n-butyl lithium as catalyst, polymerization was carried out at 50° C. for 3 hours. As the next step, while keeping the polymerization temperature at 50° C., 1680 g of styrene was added to the polymer solution by means of a feeding pump. The rate of addition was in conformity with the description in the said patent i.e. "at such a rate below the substantially average polymerization rate at the temperature", namely at 120 g per 2 hours, as described in Example 1 of the said patent. It took about 28 hours before completing of the addition. Then, after stirring was continued for an additional one hour, the polymerization was terminated in a similar way to that in Example 1. The resultant polymer solution was a white suspension, and there was recognized substantially no precipitation of lumps or sticking of polymers to walls or stirring blades in the polymerization reactor. But the stability of the suspension was very poor, and the polymer was readily separated from the solvent to easily effect sedimentation under insufficient stirring. Furthermore, when the suspension was transferred to the step for removal of the solvent, a part of the polymer resided as lumps at the bottom of the polymerization reactor or in the transfer pipes to cause troubles such as clogging of the pipes.

The physical properties of the block copolymer resin obtained according to the above method are shown in Table, from which it can be seen that the said resin is inferior to the block copolymer resin of the present invention with respect to transparency and impact strength.

EXAMPLES 2-6

According to the same procedure was described in Example 1, except that the styrene content in the $B_1$-$A_1$ segments and/or the percentage of the intermediary styrene polymer block ($A_1$) relative to the total styrene polymer block ($A_1+A_2$) is different, they were prepared block copolymer resins having the structure of $B_1$-$A_1$-$B_2$-$A_2$. As the polymerization solvent, there was employed a solvent mixture having a solubility parameter of about 7.3 (hereinafter referred to as the solvent $S_2$) comprising about 70% by weight of n-hexane, about 20% by weight of heptane and about 10% by weight of pentane. During continuous addition of styrene monomers for formation of $A_1$ block and $A_2$ block, a part of the polymer solution was sampled for measurement of conversion of the styrene monomers. The conversion of the styrene monomer was on an average 98% by weight or less, but the solubility parameter as calculated from the residual amount of the monomer and the amount of the solvent in the polymerization system was found to be maintained at 7.5 or less. The polymer mixture finally obtained was a suspension with very good stability.

The physical properties of the respective block copolymer resins are listed in Table 1.

EXAMPLE 7

A block copolymer resin was prepared in the same manner as in Example 1 except that the styrene content was 80% by weight and the solvent $S_2$ was used as the polymerization solvent.

The physical properties of the resultant block copolymer resin are shown in Table 1.

TABLE

|  | Example 1 | Example 2 | Example 3 | Example 4 |
|---|---|---|---|---|
| Block structure | $B_1$—$A_1$—$B_2$—$A_2$ | $B_1$—$A_1$—$B_2$—$A_2$ | $B_1$—$A_1$—$B_2$—$A_2$ | $B_1$—$A_1$—$B_2$—$A_2$ |
| Weight ratio of each block | 9–14–21–56 | 8–5.6–27–64.4 | 7.5–14–22.5–56 | 9.4–17.5–20.6–52.5 |
| Total styrene content (wt. %) | 70 | 70 | 70 | 70 |
| $A_1/(A_1 + A_2)$ (wt. %) | 20 | 8 | 20 | 25 |
| Styrene content in $B_1$—$A_1$ segments (wt. %) | 61 | 65 | 65 | 65 |

TABLE-continued

|  |  |  |  |  |
|---|---|---|---|---|
| Stability of polymer mixture*[1] | o | o | o | o |
| Physical properties of block copolymer resins*[2] |  |  |  |  |
| Melt flow index (Condition G) | 5.5 | 6.2 | 5.8 | 5.0 |
| Tensile strength at yield point (kg/cm$^2$) | 160 | 150 | 160 | 165 |
| Tensile elongation at break (%) | 400< | 100 | 400< | 400< |
| Izod impact strength (kg.cm/cm notched) | 45 | 3.2 | 50 | 48 |
| Total light transmittance (%) | 90 | 90 | 90 | 90 |
| Haze (%) | 3.0 | 2.3 | 3.1 | 3.0 |

|  | Example 5 | Example 6 | Example 7 | Comparative Example 2 |
|---|---|---|---|---|
| Block structure | $B_1-A_1-B_2-A_2$ | $B_1-A_1-B_2-A_2$ | $B_1-A_1-B_2-A_2$ | $B_1/A_1-A_2$ |
| Weight ratio of each block | 18.8–35–11.2–35 | 21–14–9–56 | 8.6–16–11.4–64 | 30/14–56 |
| Total styrene content (wt. %) | 70 | 70 | 80 | 70 |
| $A_1/(A_1 + A_2)$ (wt. %) | 50 | 20 | 20 | — |
| Styrene content in $B_1-A_1$ segments (wt. %) | 65 | 40 | 65 | — |
| Stability of polymer mixture*[1] | o | o | o | o |
| Physical properties of block copolymer resins*[2] |  |  |  |  |
| Melt flow index (Condition G) | 6.5 | 6.2 | 6.0 | 6.6 |
| Tensile strength at yield point (kg/cm$^2$) | 150 | 145 | 290 | 145 |
| Tensile elongation at break (%) | 300 | 130 | 50 | 30 |
| Izod impact strength (kg.cm/cm notched) | 6.5 | 3.5 | 2.6 | 2.4 |
| Total light transmittance (%) | 90 | 90 | 91 | 86 |
| Haze (%) | 2.5 | 2.0 | 1.0 | 9.5 |

N.B.:
*[1]The polymer mixture finally obtained was left to stand at 50° C. for 24 hours, and stability was judged from whether there was sedimentation of block copolymer resin by separation from the solvent or not:
o...not separated from the solvent
x...separated from the solvent
*[2]Melt flow index, Tensile strength at yield point, Tensile elongation at break and Izod impact strength were measured according to JIS-K 6871; Total light transmittance and Haze according to ASTM D-1003.

What we claim is:

1. A process for producing a block copolymer resin comprising at least one vinyl aromatic hydrocarbon polymer block and at least one polymer block primarily composed of a conjugated diene, the weight ratio of vinyl aromatic hydrocarbon to conjugated diene being 55:45 to 95:5, using an organolithium compound as a catalyst in a solvent composed principally of an aliphatic hydrocarbon, wherein the improvement comprises adding continuously a monomer of a vinyl aromatic hydrocarbon to be added for formation of the vinyl aromatic hydrocarbon polymer block, at a stage of polymerization at which the vinyl aromatic hydrocarbon content in the polymer formed has reached 55% by weight or more, at a rate which is higher than the substantial average polymerization rate of said monomer at the polymerization temperature and yet maintains the solubility parameter of the liquid phase portion in the polymerization system at substantially not higher than 7.7 to further continue polymerization.

2. A process according to claim 1, wherein the vinyl aromatic hydrocarbon content in the block copolymer resin finally obtained is from 65 to 85% by weight.

3. A process according to claim 1, wherein the vinyl aromatic hydrocarbon monomer for formation of the vinyl aromatic hydrocarbon polymer block is added, at the stage when the vinyl aromatic hydrocarbon content has reached 60% or more, continuously at such a rate that the solubility parameter of the liquid phase portion in the polymerization system is maintained substantially at from 6.0 to 7.6.

4. A process according to claim 2, wherein the vinyl aromatic hydrocarbon monomer for formation of the vinyl aromatic hydrocarbon polymer block is added, at the stage when the vinyl aromatic hydrocarbon content has reached 60% or more, continuously at such a rate that the solubility parameter of the liquid phase portion in the polymerization system is maintained substantially at from 6.0 to 7.6.

5. A process according to claim 1, claim 2, claim 3 or claim 4, wherein a block copolymer represented by the formula $B_1$-$A_1$-$B_2$-$A_2$ (wherein $B_1$ and $B_2$ represent polymer blocks composed principally of conjugated diene; and $A_1$ and $A_2$ vinyl aromatic hydrocarbon polymer blocks) is produced, the $B_1$-$A_1$ segments in said copolymer containing from 50 to 90% by weight of vinyl aromatic hydrocarbon, said $B_1$-$A_1$ segments in which the content of the intermediary vinyl aromatic hydrocarbon polymer block($A_1$) is from 10 to 40% by weight based on the total content of the vinyl aromatic hydrocarbon polymer blocks ($A_1 + A_2$) being first formed and thereafter $B_2$ segment and $A_2$ segment being further formed.

6. A process according to any one of claims 1 to 4, wherein the polymer block composed principally of conjugated diene is a hompolymer block of a conjugated diene.

7. A process according to claim 5, wherein the polymer block composed principally of conjugated diene is a homopolymer block of a conjugated diene.

8. A process according to any one of claims 1 to 4, wherein the solvent composed principally of an aliphatic hydrocarbon has a solubility parameter of from 6.0 to less than 7.6.

9. A process according to claim 5, wherein the solvent composed principally of an aliphatic hydrocarbon has a solubility parameter of from 6.0 to less than 7.6.

10. A process according to any one of claims 1 to 4, wherein the conjugated diene is butadiene and/or isoprene, and the vinyl aromatic hydrocarbon is styrene.

11. A process according to claim 5, wherein the conjugated diene is butadiene and/or isoprene, and the vinyl aromatic hydrocarbon is styrene.

12. A process according to claim 1, wherein the solvent is an aliphatic hydrocarbon having 5 to 7 carbon atoms.

13. A process according to claim 1, wherein the solvent is a mixture containing 75% or more by weight of an aliphatic hydrocarbon having 5 to 7 carbon atoms and 25% or less by weight of an alicyclic hydrocarbon having 5 to 7 carbon atoms.

14. A process according to claim 1, wherein the solvent is a mixture containing 90% or more by weight of an aliphatic hydrocarbon having 5 to 7 carbon atoms and 10% or less by weight of benzene or toluene.

15. A process according to claim 1, wherein said vinyl aromatic hydrocarbon is continuously added at said rate while keeping the existence of at least 1% by weight of unreacted monomer based on the vinyl aromatic hydrocarbon added.

16. A process according to claim 1, wherein said vinyl aromatic hydrocarbon is continuously added at said rate while keeping the existence of at least 3% by weight of unreacted monomer based on the vinyl aromatic hydrocarbon added.

17. A process according to claim 1, wherein said vinyl aromatic hydrocarbon is continuously added at said rate while keeping the existence of at least 5% by weight of unreacted monomer based on the vinyl aromatic hydrocarbon added.

18. A process for producing a block copolymer resin comprising at least one vinyl aromatic hydrocarbon polymer block and at least one polymer block primarily composed of a conjugated diene, the weight ratio of vinyl aromatic hydrocarbon to conjugated diene being 55:45 to 95:5, using an organolithium compound as a catalyst in a solvent composed principally of an aliphatic hydrocarbon, comprising the steps of:
    polymerizing a conjugated diene to form a polymer block primarily composed of a conjugated diene; and
    adding continuously a monomer of a vinyl aromatic hydrocarbon to be added for formation of the vinyl aromatic hydrocarbon polymer block, at a stage of polymerization at which the vinyl aromatic hydrocarbon content in the polymer formed has reached 55% by weight or more, at a rate which is higher than the substantial average polymerization rate of said monomer at the polymerization temperature wherein said vinyl aromatic hydrocarbon exists in an amount of at least 1% by weight or more based on the vinyl aromatic hydrocarbon added and yet maintains the solubility parameter of the liquid phase portion in the polymerization system at substantially not higher than 7.7 to further continue polymerization.

* * * * *